United States Patent
Karapantelakis et al.

(10) Patent No.: US 10,798,736 B2
(45) Date of Patent: Oct. 6, 2020

(54) NETWORK NODE AND METHOD FOR RESOURCE ALLOCATION FOR MULTIPLE RADIO ACCESS TECHNOLOGIES

(71) Applicant: Telefonaktiebolaget LM Ericsson (publ), Stockholm (SE)

(72) Inventors: Athanasios Karapantelakis, Stockholm (SE); Rafia Inam, Västerås (SE); Konstantinos Vandikas, Solna (SE); Aneta Vulgarakis Feljan, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/092,809

(22) PCT Filed: May 17, 2016

(86) PCT No.: PCT/SE2016/050442
§ 371 (c)(1),
(2) Date: Oct. 11, 2018

(87) PCT Pub. No.: WO2017/200432
PCT Pub. Date: Nov. 23, 2017

(65) Prior Publication Data
US 2019/0132867 A1    May 2, 2019

(51) Int. Cl.
*H04W 74/04* (2009.01)
*H04W 72/04* (2009.01)
(Continued)

(52) U.S. Cl.
CPC ....... *H04W 74/04* (2013.01); *H04W 72/0446* (2013.01); *H04L 5/00* (2013.01); *H04L 5/003* (2013.01); *H04W 88/06* (2013.01)

(58) Field of Classification Search
CPC . H04W 74/04; H04W 72/0446; H04W 88/06; H04L 5/003; H04L 5/00
See application file for complete search history.

(56) References Cited

U.S. PATENT DOCUMENTS

2013/0028128 A1* 1/2013 Novak ............... H04L 1/00
370/252
2014/0315564 A1   10/2014 Conway
(Continued)

FOREIGN PATENT DOCUMENTS

| EP | 2200385 A2 | 6/2010 |
|---|---|---|
| WO | 2010005649 A2 | 1/2010 |

(Continued)

OTHER PUBLICATIONS

Boyaci, A. et al., "A cross-layer adaptive channel selection mechanism for IEEE 802.11P suite", EURASIP Journal o Wireless Communications and Networking, 2015:214, Jan. 1, 2015, pp. 1-13, Springer.

(Continued)

*Primary Examiner* — Mohammad S Anwar
(74) *Attorney, Agent, or Firm* — Coats + Bennett, PLLC

(57) ABSTRACT

A method performed by a first network node (110), for managing channel access for a Wireless Device (WD) (120). The WD (120) supports one or more Radio Access Technologies (RATs). The first network node (110) receives a radio channel access request from the WD (120), which radio channel access request comprises information regarding a number of requirements on the channel access. The first network node (110) determines a channel access schedule based on the received information and channel statuses for the channels and RATs available within a geographical served by the first network node (110). The channel access schedule comprises information about the radio channel assigned to the WD (120). The first network node (110) further sends the channel access schedule to the WD (120).

15 Claims, 7 Drawing Sheets

(51) Int. Cl.
*H04L 5/00* (2006.01)
*H04W 88/06* (2009.01)

(56) References Cited

U.S. PATENT DOCUMENTS

| | | | |
|---|---|---|---|
| 2015/0188681 A1* | 7/2015 | Li | H04W 72/12 370/252 |
| 2017/0094677 A1* | 3/2017 | Liu | H04W 72/1215 |

FOREIGN PATENT DOCUMENTS

| | | | |
|---|---|---|---|
| WO | 2011123531 A1 | 10/2011 | |
| WO | 2012139647 A1 | 10/2012 | |
| WO | 2013069819 A1 | 5/2013 | |
| WO | 2014060543 A1 | 4/2014 | |
| WO | 2016045748 A1 | 3/2016 | |
| WO | 2016160611 A2 | 10/2016 | |
| WO | 2017011129 A1 | 1/2017 | |

OTHER PUBLICATIONS

Wang, S. et al., "Improving the Channel Utilization of IEEE 802.11p/1609 Networks", 2009 IEEE Wireless Communications and Networking Conference, Apr. 5, 2009, pp. 1-6, IEEE.

* cited by examiner

NETWORK NODE AND METHOD FOR RESOURCE ALLOCATION FOR MULTIPLE RADIO ACCESS TECHNOLOGIES

TECHNICAL FIELD

Embodiments herein relate to a network node and a wireless device and methods therein. In particular, it relates to a method for resource allocation for multiple Radio Access Technologies (RATs).

BACKGROUND

Wireless devices (WDs), such as User Equipment (UE), are enabled to communicate wirelessly in a cellular communications network or wireless communication system, sometimes also referred to as a cellular radio system or cellular networks. The communication may be performed e.g. between two WDs which may be referred to as Device to Device (D2D) communication, between a WD and a regular telephone and/or between a WD and a server via a Radio Access Network (RAN) and possibly one or more core networks, comprised within the cellular communications network.

WDs may further be referred to as wireless terminals, mobile terminals and/or mobile stations, mobile telephones, cellular telephones, laptops, tablet computers or surf plates with wireless capability, just to mention some further examples. The UEs in the present context may be, for example, portable, pocket-storable, hand-held, computer-comprised, or vehicle-mounted mobile devices, enabled to communicate voice and/or data, via the RAN, with another entity, such as another wireless terminal or a server.

The cellular communications network covers a geographical area which is divided into cell areas, wherein each cell area is being served by a network node. A cell is the geographical area where radio coverage is provided by the network node, which area may also be referred to as a service area, a beam or a beam group.

The network node may further control several transmission points, e.g. having Radio Units (RRUs). A cell can thus comprise one or more network nodes each controlling one or more transmission/reception points. A transmission point, also referred to as a transmission/reception point, is an entity that transmits and/or receives radio signals. The entity has a position in space, e.g. an antenna. A network node is an entity that controls one or more transmission points. The network node may e.g. be a base station such as a Radio Base Station (RBS), eNB, eNodeB, NodeB, B node, or BTS (Base Transceiver Station), depending on the technology and terminology used. The base stations may be of different classes such as e.g. macro eNodeB, home eNodeB or pico base station, based on transmission power and thereby also cell size.

Further, each network node may support one or several communication technologies. The network nodes communicate over the air interface operating on radio frequencies with the UEs within range of the network node. In the context of this disclosure, the expression Downlink (DL) is used for the transmission path from the base station to the mobile station. The expression Uplink (UL) is used for the transmission path in the opposite direction i.e. from the UE to the base station.

In 3rd Generation Partnership Project (3GPP) Long Term Evolution (LTE), base stations, which may be referred to as eNodeBs or even eNBs, may be directly connected to one or more core networks. In LTE the cellular communication network is also referred to as E-UTRAN.

An E-UTRAN cell is defined by certain signals which are broadcasted from the eNB. These signals contain information about the cell which can be used by UEs in order to connect to the network through the cell. The signals comprise reference and synchronization signals which the UE uses to find frame timing and physical cell identification as well as system information which comprises parameters relevant for the whole cell.

Current state of art in scheduling for wireless channel access focuses on optimization per single network technology, it does however not address cases where clients accessing the network support multiple radio access technologies. A typical example of such a case are vehicles equipped with IEEE 802.11p, operating in the 5.9 GHz—unlicensed—spectrum band, and cellular transceivers, such as e.g. 3G, LTE transceivers, which are operating in licensed spectrum bands, and are configured to transmit over both Radio Access Technologies (RATs).

Problems with current IEEE-based wireless access solutions are related to the fact that they rely on unscheduled channel access protocols, such as e.g. CSMA/CA, to access the channel. This may lead to collision problems when more than one client are trying to access the channel simultaneously. These collision problems are accentuated by an increase in the number of clients in the area, such as e.g. a large number of vehicles in a heavy/congested traffic scenario. In particular, the IEEE 802.11 specification does not address automatic channel selection.

SUMMARY

It is therefore an object of embodiments herein to enhance the performance in a wireless communications network.

According to a first aspect of embodiments herein, the object is achieved by a method performed by a first network node, for managing channel access for a Wireless Device (WD). The WD supports one or more Radio Access Technologies (RATs). The first network node receives a radio channel access request comprising information regarding a number of requirements on the channel access from the WD. The first network node determines a channel access schedule based on the received information and channel statuses for the channels and RATs available within a geographical area served by the network node. The channel access schedule comprises information about a radio channel assigned to the WD. The first network node further sends the channel access schedule to the WD.

According to a first aspect of embodiments herein, the object is achieved by a method performed by a Wireless Device (WD), for accessing a channel. The WD supports one or more Radio Access Technologies (RATs). The WD sends a channel access request to a first network node. The channel access request comprises information regarding a number of requirements on the channel access. The WD receives a channel access schedule from the first network node, which channel access schedule comprises information about a radio channel assigned to the WD. The WD further connects to the radio channel assigned to the WD according to the channel access schedule received from the first network node.

According to a third aspect of embodiments herein, the object is achieved by a first network node for performing a method for managing channel access for a Wireless Device (WD). The WD supports one or more Radio Access Technologies (RATs). The first network node is configured to receive, from the WD, a radio channel access request comprising information regarding a number of requirements on the channel access. The first network node is configured to determine a channel access schedule based on the received information and channel statuses for the channels and RATs available within a geographical area served by the network node, which channel access schedule comprises information about a radio channel assigned to the WD. The first network node is further configured to send the channel access schedule to the WD.

According to a fourth aspect of embodiments herein, the object is achieved by a Wireless Device (WD) for performing a method for accessing a channel. The WD supports one or more Radio Access Technologies (RATs). The WD is configured to send a channel access request to a first network node, which channel access request comprises information regarding a number of requirements on the channel access. The WD is configured to receive a channel access schedule from the first network node, which channel access schedule comprises information about a radio channel assigned to the WD. The WD is further configured to connect to the radio channel assigned to the WD 120 according to the channel access schedule received from the first network node 110.

This cross-RAT approach yields benefits over individually optimized RATs both in terms of spectrum economy, due to reduced spectrum utilization, but also in terms of client quality of service, e.g. due to avoidance of clients trying access congested channels and getting their access requests declined.

Hence, the embodiments herein provide a cross-RAT scheduling mechanism that benefits RATs that have non-scheduled wireless channel access methods. This scheduling improves the quality of service of critical traffic between WDs, such as vehicles, or between WDs and infrastructure, even when communication is performed over RATs that do not provide scheduling for wireless channel access.

BRIEF DESCRIPTION OF THE DRAWINGS

Examples of embodiments herein are described in more detail with reference to the attached drawings in which.

DETAILED DESCRIPTION

The embodiments herein relate to a network node and a method for efficient radio channel access across multiple radio access technologies for a first WD wanting to communicate with a second WD. The selection of a radio channel is based on a number of criteria, which includes mobility pattern, authority to use part of the spectrum or not, criticality and type of data traffic, as well as confidentiality of a WD.

Figure 1:
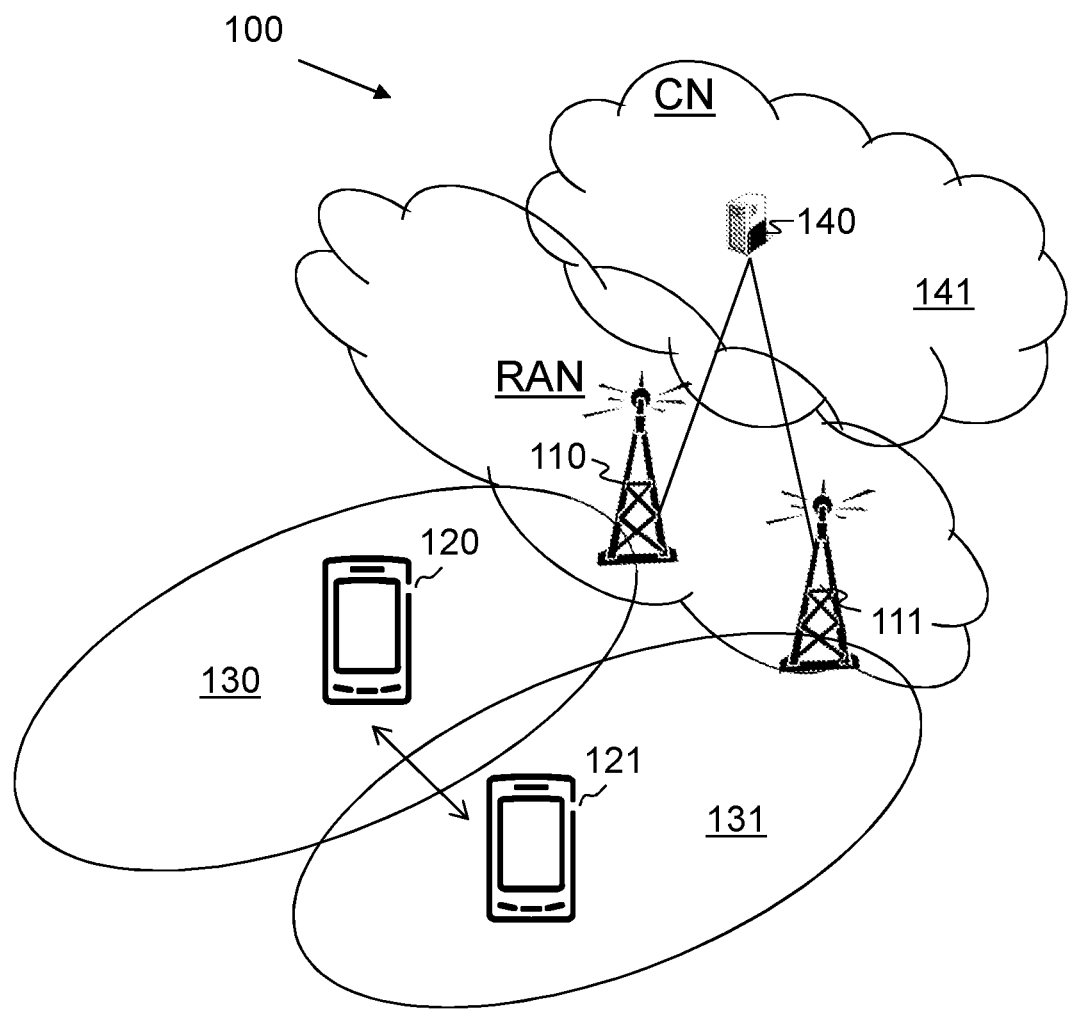
FIG. 1 is a schematic block diagram illustrating embodiments of a wireless communications network.

FIG. 1 depicts an example of a wireless communications network 100 according to a first scenario in which embodiments herein may be implemented. The wireless communications network 100 is a wireless communication network such as an LTE, E-Utran, WCDMA, GSM network, any 3GPP cellular network, Wmax, or any cellular network or system.

Embodiments herein relate to communication networks in general. FIG. 1 is a schematic overview depicting a wireless communication network 1. The communication network 1 comprises a Radio Access Network (RAN) and a Core Network (CN). The communication network 1 may use a number of different technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. In the communication network 100, a first WD 120 and a second WD 121 communicate via one or more Access Networks (AN), e.g. RAN, to one or more CNs. The first and the second WDs 120, 121 may e.g. be a wireless device, a mobile station, a non-access point (non-AP) STA, a STA, and/or a wireless terminal. It should be understood by those skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a base station communicating within a cell.

The RAN comprises a set of radio network nodes, such as radio network nodes 110, 111 each providing radio coverage over one or more geographical areas, such as a cell 130, 131 of a radio access technology (RAT), such as LTE, UMTS, Wi-Fi or similar. The radio network node 110, 111 may be a radio access network node such as radio network controller or an access point such as a wireless local area network (WLAN) access point or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of serving a wireless device within the cell, which may also be referred to as a service area, served by the radio network node 110, 111 depending e.g. on the first radio access technology and terminology used.

The WD 120 is located in the cell 130 of the network node 110, which is referred to as the serving cell, whereas the cell 131 of the network nodes 111 are referred to as neighboring cells. Although, the network node 110 in FIG. 1 is only depicted providing a serving cell 130, the network node 110 may further provide one or more neighboring cells 131 to the serving cell 130.

The WDs 120, 121 may further be configured to communicate over a plurality of different RATs, such as LTE, UMTS, Wi-Fi or similar.

Figure 2:
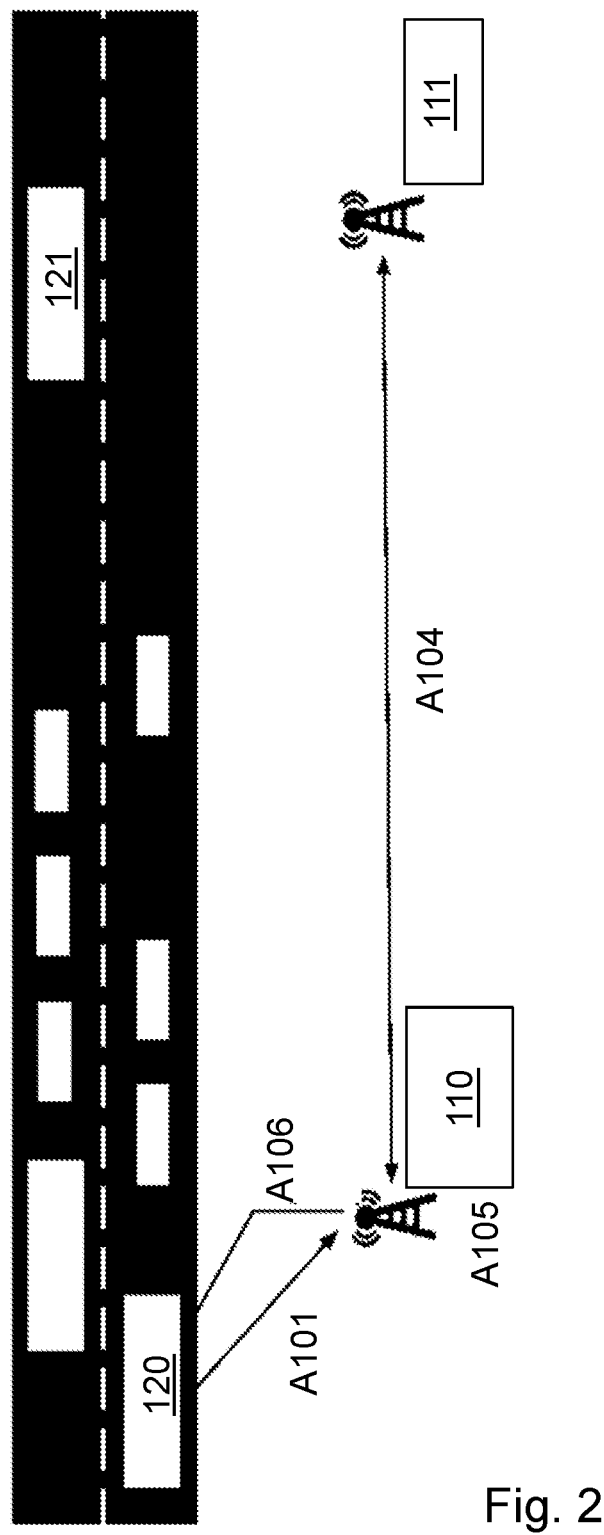
FIG. 2 is a schematic block diagram illustrating embodiments of a wireless communications network in a vehicular environment.

FIG. 2 shows an instantiation of the system described above, in a vehicular environment. In the embodiment disclosed herein the WD 120 may be a vehicle equipped with multi-RAT transceivers, such as e.g. 802.11p and LTE. The WD may request wireless channel access from a channel access scheduler comprised in the first network node 110. The network node 110 performs a decision process and decides on an channel access schedule for the requesting WD 120, such as e.g. a vehicle. The decision process may e.g. be performed by means of the channel access scheduler, and may be referred to as allocating access for the WD 120. The decided channel access schedule is then sent to the requesting WD 120.

FIG. 2 shows the main components of the system. The system comprises the following components:

One or more connected WDs, such as a first WD 120 and a second WD 121. The WDs 120, 121 may e.g. be vehicles, which may be equipped with equipped with multiple radio transceivers, which support one or more RATs, such as e.g. Vehicle to Infrastructure (V2I). The first WD 120 may send a Channel Access Request to a network node 110 for accessing the second WD 121, which network node 110 may comprise a Channel Access Scheduler. The WD 110 may receive a Channel Access Timetable, which the WD 120 may use to access a wireless channel. The channel access request may comprise a number of requirements from the WD 120 as well as a description of the radio capabilities of the WD 120.

The structure and the parameters comprised in the Channel Access Request initiated from the WD 120 towards a network node is shown in Table 1. These parameters are exemplified in the Table 1 using standard XML format, said XML being part of the schedule request payload. Any suitable combination of the parameters or part of the parameters may be sent to the network node in the Channel Access Request.

TABLE 1

Parameters comprised in Channel Access Request

| Parameter Title | Parameter Description | Example Representation |
|---|---|---|
| Vehicle Trajectory | This identifies the current location, direction of travel and current velocity of the WD 120, which in this exemplary embodiment is a vehicle. | \<vehicleTrajectory\><br>  \<location\><br>    \<latitude\>34.324\</latitude\><br>    \<longitude\>32.432\</longitude\><br>  \</location\><br>  \<directionOfTravel\>SW\</directionOfTravel\><br>  \<velocity\><br>    \<value\>45\</value\><br>    \<unitOfMeasurement\>kmh\</unitOfMeasurement\><br>  \</velocity\><br>\</vehicleTrajectory\> |
| Data traffic characteristics | These sets of parameters identify characteristics of the data traffic transmitted and/or received from the WD 120, such as duration and type. | \<trafficCharacteristics\><br>  \<duration type="bounded"\> \<!-- can also be indefinite, undecided, in which case no value is present--\><br>    \<value\>3600\</value\><br>    \<unitOfMeasurement\>sec\</unitOfMeasurement\><br>  \</duration\><br>  \<trafficClass class="sensitive"\> \<!--categories: mission-critical, sensitive, best-effort--\><br>    \<trafficType name="VoIP"\><br>      \<protocolStack\><br>        \<network\>IPv4\</network\><br>        \<transport\>TCP\</transport\><br>    \</trafficType\><br>\</trafficCharacteristics\> |
| Criticality of data traffic | This property identifies the criticality of the data traffic, which translates to whether there is a requirement for a specific level of latency and/or throughput. | \<criticalityOfDataTraffic\><br>  \<latency required="yes"\><br>    \<value\>20\</value\><br>    \<unitOfMeasurement\>sec\</unitOfMeasurement\><br>  \</latency\><br>  \<throughput required="yes"\><br>    \<value\>150\</value\><br>    \<unitOfMeasurement\>kbps\</unitOfMeasurement\><br>  \</throughput\><br>\</criticalityOfDataTraffic\> |
| Vehicle Radio Capabilities | This property identifies what type of communication protocols the WD 120, which in this exemplary embodiment is a vehicle, supports. This information also contains the parts of the spectrum where the WD | \<vehicleRadios\><br>  \<radio name="802.11p"\><br>    \<spectrum type="unlicensed"\><br>      \<range id="802.11p.1"\><br>        \<lowerBound\>5.85\</lowerBound\><br>        \<higherBound\>5.925\</higherBound\><br>      \<range\><br>      \<unitOfMeasurement\>GHz\</unitOfMeasurement\><br>    \</spectrum\><br>    \<protocolStack\><br>      \<phy\>802.11p\</phy\><br>      \<mac\>802.11p\</mac\><br>    \</protocolStack\><br>  \</radio\><br>  \<radio name="LTE"\><br>    \<spectrum type="licensed"\> |

TABLE 1-continued

Parameters comprised in Channel Access Request

| Parameter Title | Parameter Description | Example Representation |
|---|---|---|
| | 120 can transmit, either limited by the radio capabilities of the radio or by licensing (the latter applies to licensed spectrum). | <range id="LTE.1">   <lowerBound>2.52</lowerBound>   <higherBound>2.55</higherBound> <range> <range id="LTE.2">   <lowerBound>2.62</lowerBound>   <higherBound>2.67</higherBound> <range> <unitOfMeasurement<>GHz></unitOfMeasurement> </spectrum> <protocolStack>   <phy>LTE</phy>   <mac>LTE</mac> </protocolStack> </radio> </vehicleRadio> |

One or more network nodes 110, 111 each network node covering a specific geographical area. The network nodes 110, 111 may actively probe, which may also be referred to as continuously measuring, all wireless channels for all RATs in the geographical areas served by the network nodes. This is done in order to determine the quality of each channel. The probing may e.g. be performed by triggering the WD 120 to perform measurements on the channels and RATs supported by the WD 120, and then sending a measurement report comprising the status of the measured channels for the measured RATs to the network node 110. The network nodes 110, 111 may exchange channel status messages with each other, regarding the status of the wireless channels within the geographical areas that the network nodes 110, 111 are responsible for. This exchange may be performed continuously. The channel statuses measured and/or received may be stored for each channel in a database. The channel status may e.g. be stored in a table as illustrated in Table 2 below. The probing of the channels and the storing of the channel status may be performed by a Channel Access Scheduler comprised in the network nodes 110, 120.

TABLE 2

Example of channel status stored in the Channel Access Scheduler

| RAT | Channels | Signal Quality (RSRQ) |
|---|---|---|
| 802.11p | 5,855-5,865 | −6 (Excellent) |
| | 5,865-5,875 | −5 (Excellent) |
| | 5,875-5,885 | −12 (Fair) |
| | 5,895-5,905 | −11 (Fair) |
| | 5,905-5,915 | −18 (Poor) |
| | 5,915-5,925 | −19 (Poor) |
| LTE band 40 (2300-2400), | 2300-2320 | −10 (Fair) |
| 20 Mhz | 2320-2340 | −17 (Poor) |
| channels | 2340-2360 | −10 (Fair) |
| | 2360-2380 | −11 (Fair) |
| | 2380-2400 | −5 (Excellent) |

In Table 2, a Reference Signal Received Quality (RSRQ) metric is used for determining the quality of the channels. However, the embodiments herein are not limited with regards to the metric used for channel status. Hence, any other metric for measuring the quality of the channel, such as e.g. Received Signal Strength Indicator (RSSI) and/or Reference Signal Received Power (RSRP), may be used. Furthermore, the embodiments herein are not limited to the RATs disclosed in Table 2, instead the method according to the embodiments herein may be performed for any RAT supported by the WD 120, such as e.g. any other band available in LTE or future technologies.

Based on the information comprised in the Channel Access Request received from the WD 120 and the Channel Statuses measured channel statuses, the first network node 110 may determine a Channel Access Schedule, which in FIG. 2 is referred to as allocating access, for the WD 120. The Channel Access Schedule may be determined such that the quality of service of the traffic on the radio channels is improved. The first network node 110 may then return the determined Channel Access Schedule to the WD 120.

Figure 3:
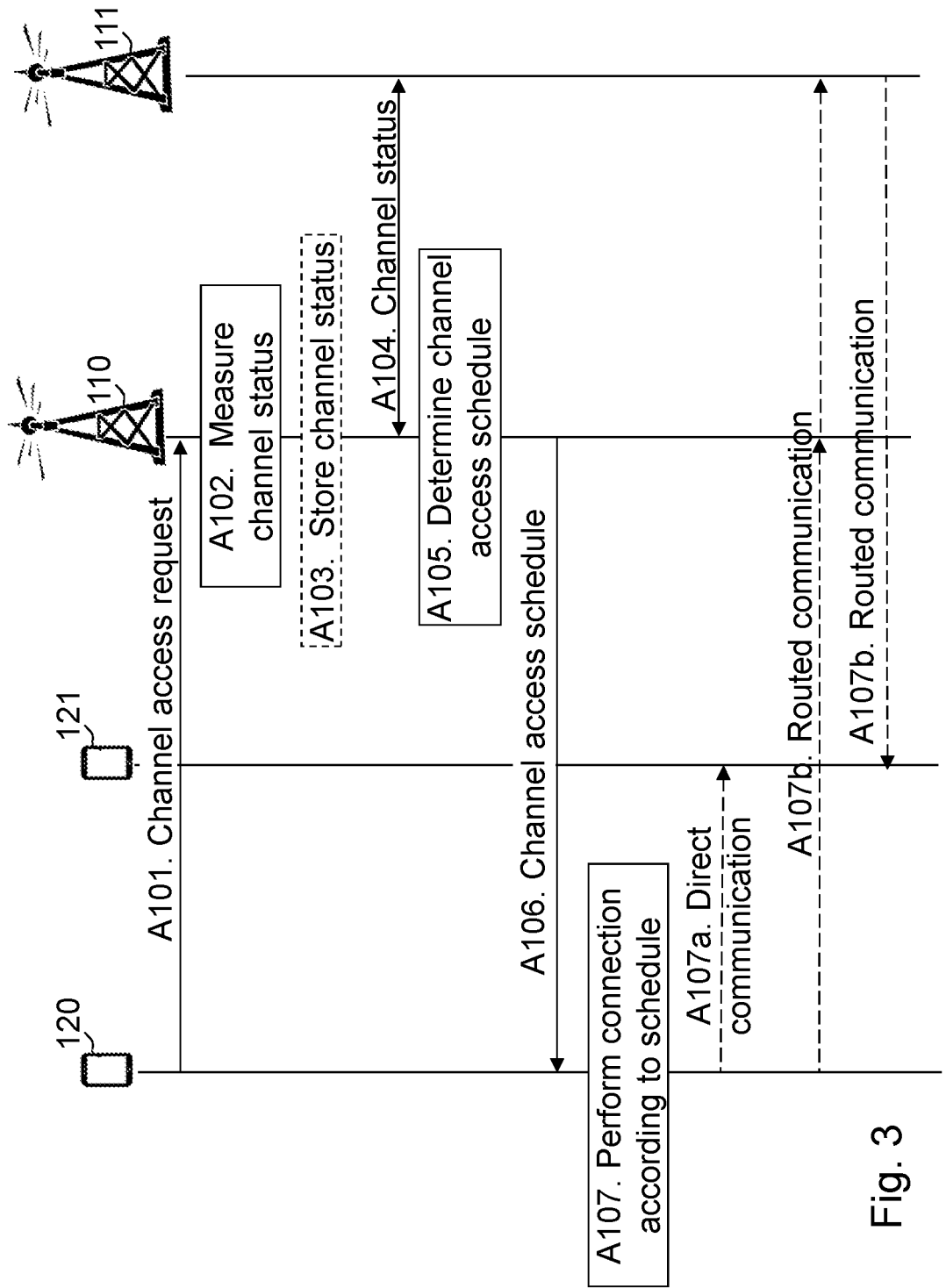
FIG. 3 is a flowchart depicting embodiments of a method in a communications network.

FIG. 3, is a sequence diagram illustrating one embodiment where channel allocation for D2D communication is assisted by a network node 110. For the purposes of simplicity in this example we assume that only two WDs are communicating with each other. Moreover, the communication may be performed via network nodes when a quality of transmission, which may herein also be referred to as transmissionQuality, in D2D drops. The network node 110 may use information from Table 1 in order to decide on the appropriate channel. This decision may e.g. be performed using a function referred to as calculateChannel.

The interaction described in FIG. 3 may be triggered when a first WD 120 wants to communicate with a second WD 121 prior to any uplink or downlink activities. The first WD 120 may either send a Channel Access Request to the network node 110 in order to receive a Channel Access Schedule from the network node 110 or it may use the result from a previous communication between the first WD 120 and the second WD 121.

By using the result from a previous communication the signaling in the communications network 100 may be reduced, which further improves the spectrum economy in the communications network 100.

Action A101

The first WD 120 sends a Channel Access Request for communication with the second WD 121 to the first network node 110. The channel access request may comprise information regarding a number of requirements on the channel access, which information allows the first network node 110 to determine a suitable Channel Access Schedule for the first WD 120.

Action A102

When the first network node 110 has received the Channel Access Request from the first WD 120, it may measure a channel status for all channels for all RATs within a geographical area served by the first network node 110.

Action A103

When the first network node 110 has measured the channel status for all channels for all RATs within a geographical area served by the first network node 110, the first network node 110 may store the measured channel status.

Action A104

The first network node 110 may further exchange channel status information with a second network node 111, in order to determine the Channel Access Schedule for the first WD 120 when there is a risk that the first WD 120 may be out of the range of the first network node 110 before a duration of the Channel Access Schedule elapses. The first network node 110 may send the channel status for all channels and RATs within the area served by the first network node 110 to the second network node 111 and may receive the channel status for all channels and RATs within the area served by the second network node 111 from the second network node 111.

Action A105

The first network node 110 determines a Channel Access Schedule to be used by the first WD 120 in order to access the second WD 121, based on the received information and/or the measured and/or received channel status.

Action A106

The first network node 110 sends the Channel Access Schedule to the first WD 120.

Action A107

The first WD 120 connects to the second WD 121 using the channel(s) indicated in the Channel Access Schedule received from the first network node 110.

Action A107a

In a first embodiment herein, the Channel Access Schedule may indicate that the first WD 120 shall use a D2D RAT to communicate directly with the second WD 121. The first WD 120 may then connect to the second WD 121 using the indicated D2D RAT, such as e.g. 802.11p (5.9 GHz).

Action A107b

In a second embodiment herein, the first WD 120 and the second WD 121 may be too far distance from each other to allow D2D communication. In this embodiment, the Channel Access Schedule may indicate to the first WD 120 to communicate with the second WD 121 via a network node 110, 111. The first WD 120 may then connect to the second WD 121 using a second RAT, such as e.g. WiFi or LTE.

The communication from the first WD 120 to the second WD 121 and vice versa, may e.g. be routed via the first network node 110. It may however also be routed via a plurality of network nodes, such as e.g. the first network node 110 serving the first WD 120 and the second network node 111 serving the second WD 121.

In a further embodiment, the Channel Access Schedule may comprise a series of different RATs and network nodes, such as radio network nodes, to be used by the first WD 120 and the second WD 121 at different time slots in order to communicate with each other. An example of such a time series may e.g. [timeSlot1, RAT1; timeSlot2, D2DRAT; timeSlot3, RAT2; . . . etc], where the WDs 120, 121 use a first RAT (RAT1) during a first time slot (timeSlot1), a Device to Device RAT (D2DRAT) during a second time slot (timeSlot2), a second RAT (RAT2) during a third time slot (timeSlot3). Hence, the first WD 120 and the second WD 121 may e.g. communicate via one or more network node(s) 110, 111 during the first and the third time slot and via direct communication (D2D) during the second time slot. Using D2D communication has the benefit that the communication is available even if the communication infrastructure is not available. However, the D2D communication is only available over short distances. The communication using e.g. LTE (2.4 GHz) is more stable than using e.g. the D2D communication via 802.11p (5.9 GHz). Hence, if both channels are available to the WDs 120, 121 it is more reliable to use LTE communication as backup for the communication between the first WD 120 and the second WD 122, in case the D2D connection fails, e.g. due to bad Quality of Service (QoS) of the channel or due to the first and the second WDs being located to far from each other for direct communication. Thereby the quality of service for the communication between the first and the second WDs (120, 121) may be improved while at the same time improving the spectrum economy of the channels.

The Actions A101 to A107 will be described in more detail with regards to the first network node 110 and the first WD 120 in the following.

Figure 4:
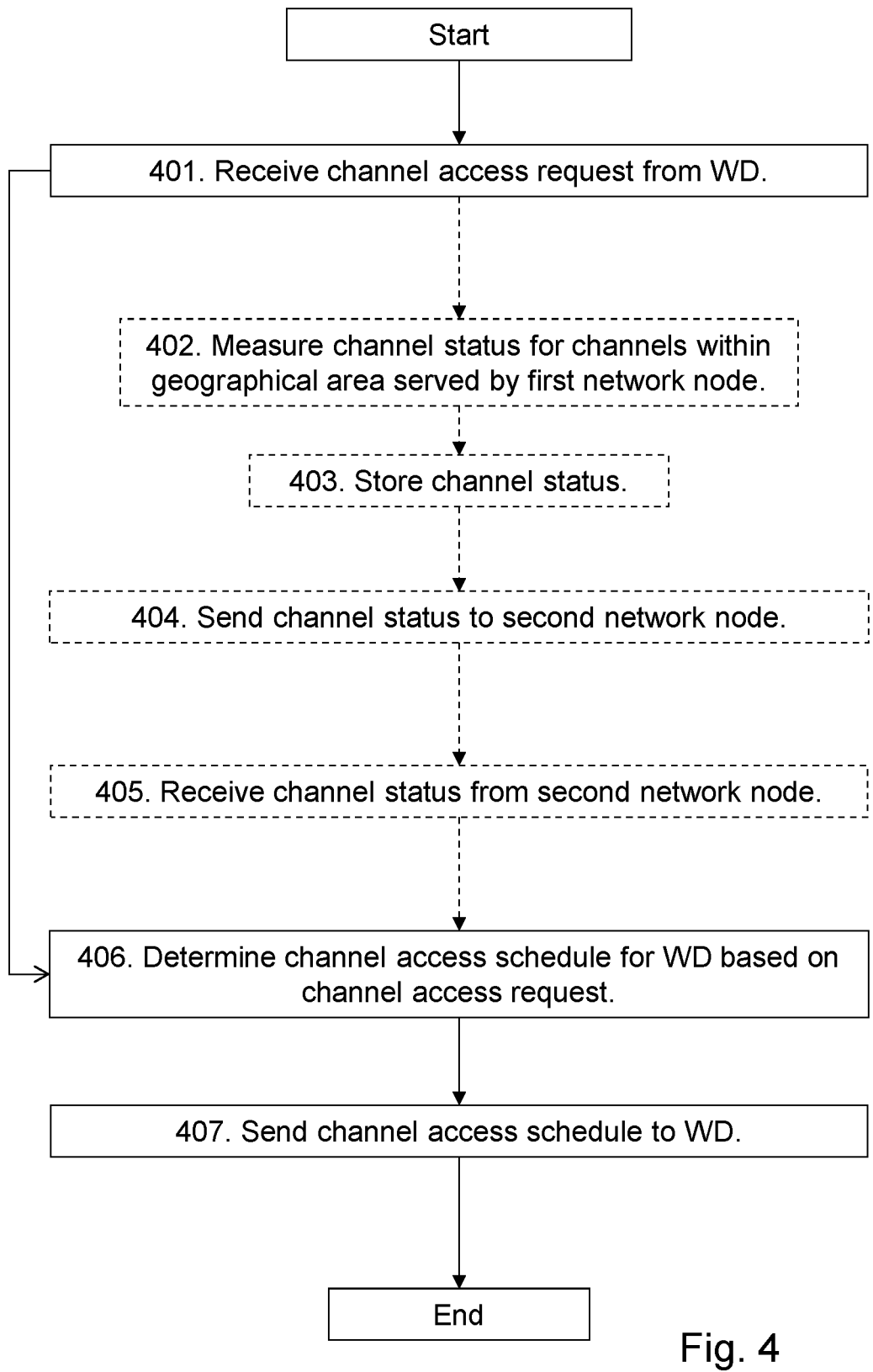
FIG. 4 is a flowchart depicting embodiments of a method in a network node.

An example of embodiments of a method performed by a first network node 110, for managing channel access for a Wireless Device (WD) 120, will now be described with reference to a flowchart depicted in FIG. 4. The WD 120 supports one or more Radio Access Technologies (RATs). The method comprises the following actions, which actions may be taken in any suitable order.

Action 401

The first network node 110 receives a radio channel access request from the WD 120. The channel access request may comprise information regarding a number of requirements on the channel access. The information may comprise one or more of a mobility pattern, a data traffic characteristic, a criticality of the data traffic and/or the radio capabilities of the WD 120. The mobility pattern may comprise a direction of travel and/or a current speed of the WD 120. The radio capabilities of the WD 120 may identify the type of communication protocols and the parts of a frequency spectrum which the WD 120 is able to access. The data traffic characteristics comprise information about duration and type of the data traffic transmitted and/or received from the WD 120. The criticality of data traffic may comprise information about requirements for a specific level of latency and/or throughput for the data traffic transmitted and/or received from the WD 120.

In an exemplary embodiment a first WD 120 supporting two RATs with status as disclosed in Table 1, wants to access a channel of a second WD 121. The first WD 120 may e.g. be a vehicle in transit as illustrated in FIG. 2. The WD 120 transmits a Channel Access Request to the network node 110. The Channel Access Request may be sent using a getChannelFor command. In this embodiment, the Channel Access Request, such as e.g. the getChannelFor command, may comprise a subset of the parameters illustrated in Table 1, such as e.g. the following:

The radio capabilities of the radios on first WD 120, which may e.g. be that the WD 120 is capable of 802.11p/WiFi and/or LTE communication.

The criticality of the traffic from the WD 120, herein also referred to as criticality$_{reqx}$, such as whether the traffic is e.g. mission critical traffic or best-effort web traffic, etc. The scale of criticality may vary and may be of a qualitative scale, from highly critical to not critical, each level indicating different degree of priority of the traffic to the first network node 110. For reasons of security and to prevent abuse of the prioritization, requests for highly critical traffic may be sent encrypted and digitally signed using a certificate from a provider of trust to the first network node 110. In a further embodiment, the criticality of traffic may also be deduced from the first network node 110 itself, e.g. through deep packet inspection and/or historical data. One method for classifying traffic may be to use a 1-5 qualitative "traffic criticality" scale, in which a smaller integer represents traffic of a higher criticality. This scale may be matched to current quality of service mechanism in LTE networks, which are based on QoS Class Identifier (QCI) priority classes. Table 3 discloses the criticality of traffic for different WDs 120, 121, based on the resource type of the WD 120, 121, such as if the WD 120, 121 is configured for Guaranteed Bit Rate (GBR) or not, and the priority, the packet delay budget as well as the packet error loss of the WD 120, 121. Table 3 further discloses the QCI priority classes corresponding to the different steps in the traffic criticality scale.

TABLE 3

Traffic criticality for different types of WDs

| Traffic criticality | QCI | Resource Type | Priority | Packet Delay Budget | Packet Error Loss |
|---|---|---|---|---|---|
| 1 | 1 | GBR | 2 | 100 ms | $10^{-2}$ |
|   | 3 | GBR | 3 | 50 ms | $10^{-3}$ |
|   | 65 | GBR | 0.7 | 75 ms | $10^{-2}$ |
|   | 65 | GBR | 0.7 | 75 ms | $10^{-2}$ |
| 2 | 2 | GBR | 4 | 150 ms | $10^{-3}$ |
|   | 4 | GBR | 5 | 300 ms | $10^{-6}$ |
|   | 66 | GBR | 2 | 100 ms | $10^{-2}$ |
| 3 | 69 | non-GBR | 0.5 | 60 ms | $10^{-6}$ |
|   | 5 | non-GBR | 1 | 100 ms | $10^{-6}$ |
| 4 | 6 | non-GBR | 6 | 300 ms | $10^{-6}$ |
|   | 7 | non-GBR | 7 | 100 ms | $10^{-3}$ |
|   | 70 | non-GBR | 5.5 | 200 ms | $10^{-6}$ |
| 5 | 8 | non-GBR | 8 | 300 ms | $10^{-6}$ |
|   | 9 | non-GBR | 9 | 300 ms | $10^{-6}$ |

The mobility pattern of the WD 120, herein also referred to as mobpattern$_{reqx}$, which may comprise the direction of traffic, such as e.g. south-west and the current speed of the WD 120, herein also referred to as nodevelocity$_{reqx}$, which may be expressed in km/h or in mph.

The desired duration of schedule, herein also referred to as duration$_{reqx}$, which may e.g. be expressed in seconds. In some scenarios, especially when the duration of schedule is long, the first network node 110 may not be able to provide the desired duration due to availability of current and future channel resources. In such a scenario, the first network node 110 may provide the best possible allocation which takes the criticality of traffic into consideration and which is as long as possible, in order to improve the QoS of the communication between the first and the second WDs (120, 121).

Action 401 corresponds to Action A101 as discussed above with regards to FIG. 3.

Action 402

The first network node 110 may measure a channel status for all channels for all RATs within a geographical area served by the first network node 110.

Action 402 corresponds to Action A102 as discussed above with regards to FIG. 3.

Action 403

When the first network node 110 has measured the channel status for all RATs within the geographical area, the first network node 110 may store the channel statuses measured. The channel statuses may be stored in the first network node 110 or in a second network node, such as e.g. in a radio network node, in a core network node or in a distributed node comprised in a cloud 141.

Action 403 corresponds to Action A103 as discussed above with regards to FIG. 3.

Action 404

The first network node 110 may further send the channel status for all channels for all RATs within the geographical area served by the first network node 110, to a second network node 111.

If the duration of the scheduling requested by the first WD 120 is long and the mobility pattern of the first WD 120 indicates that the first WD 120 may be out of the range of the current network node 110 before duration of the Channel Access Schedule elapses, then the first network node 110 may communicate with a second network node 111 in the trajectory of the first WD 120 in order to collectively determine a Channel Access Schedule for the first WD 120. The communication may e.g. start with the first network node 110 sending the channel status for all channels for all RATs within the geographical area served by the first network node 110, to the second network node 111.

Action 404 is similar to Action A104 as discussed above with regards to FIG. 3.

Action 405

In order to collectively determine the Channel Access Schedule for the first WD 120, the first network node 110 may further receive a channel status for all channels for all RATs within the geographical area served by the second network node 111, from the second network node 111.

The channel status received from the second network node 111 may further be stored by the first network node 110 in order to be able to quickly access the channel status without having to repeatedly communicate with the second network node 111.

Action 405 is similar to Action A104 as discussed above with regards to FIG. 3.

Action 406

The first network node determines a Channel Access Schedule for the first WD 120 based on the information received in the Channel Access Request and/or the channel statuses received and/or stored in the network node 110. The Channel Access Schedule comprises information about a radio channel assigned to the first WD 120. The Channel Access Schedule may e.g. comprise a list of channels and RATs assigned to the first WD 120 for different time slots.

In one embodiment herein, the first network node 110 may determine the Channel Access Schedule for the first WD 120 using the following function:

Let req, be the request from a WD x, where criticality$_{reqx} \in \{1, 2, 3, 4, 5\}$, mobpattern$_{reqx} \in \{N,NE,NW,S,SW,SE,E,W\}$, nodevelocity$_{reqx} \in (0, +\text{inf})$ and duration$_{reqx} \in N$ Let sRAT$_k$, k $\in \{1, n\}$ be the status of any of the n RATs of the first network node 110 serving the above request, Let CsRaTk=$\{c1, \ldots cn\}$ be the channels available for every sRAT$_k$, and cx=$\{$spectrum_rangecx, statuscx$\}$ $\forall$cx $\in$ CsRaTk Let Status=$\{$sRAT$_1, \ldots,$ sRAT$_n\}$ be the set of status of channels of all n RATs available.

For reasons of simplicity, it is further assumed that for mobility greater than a velocity referred to as escape Velocity, and duration greater than a time $t_{escapeVelocity}$, towards any direction, the serving network node, in this case the first network node 110, will be out of range for the first WD 120, and therefore will have to communicate with a neighboring second network node 111 for resource reservation. It is also assumed that escape Velocity is constant for the duration of the resource allocation request, as well as that all n RATs available from the first network node 110 are supported by the first WD 120.

According to the scenario of this embodiment, an exemplary algorithm for determining the allocation of the first WD 120 may look like below:

```
For every sRATk, k ∈ {1, n}
    For every cx ∈ CsRaTk, x = {1, ..., n} {
        If statuscx = "Good" AND criticalityreqx >= 2 AND criticalityreqx
<= 3 {
                If (nodeVelocity > escapeVelocity && duration >
tescapeVelocity) {
                        allocationData = reserveResourcesFromAdjacentCAS(
                            criticalityreqx,
                            durationreqx - tescapVelocity,
                            mobpatternreqx,
                            nodevelocityreqx);
                        if (allocationData.responseCode == OK){
                            return [
                                {[spectrum_rangecx, durationreqx-
tescapVelocity],
                                    allocationData.accessList;
                            }
                        else
                            return [spectrum_rangecx, durationreqx-
tescapVelocity],
                    }
                else
                        return [spectrum_rangecx, durationreqx]
        }
        Else if statuscx = "Fair" AND criticalityreqx >= 4 AND
criticalityreqx <= 5
                // Same process as first "if" statement
        Else if statuscx = "Excellent" AND criticalityreqx == 1
                // Same process as first "if" statement
}
Return "No allocation possible for given criticality and channel
status"
```

The above algorithm iterates all sRATs, and all channels for each sRAT. Based on the criticality of the data traffic, the first network node 110 selects an appropriate RAT and channel within the selected RAT to allocate to the first WD 120. If the combination of the velocity and the requested duration indicates that the first WD 120 may be out of range of the first network node 110, then the first network node 110 may request scheduling of resources from at least a second network node 111 in the trajectory of the first WD 120.

This request may be sent to the second network node 111 using a reserveResourcesFromAdjacentCAS command. The selection of the second network node 111 to send the request to may be based on the speed and trajectory of the WD 120, which the aforementioned command may use as input. The second network node 111 may perform the Action 406 for determining the Channel Access Schedule, as described above for the first network node 110. The action of determining the Channel Access Schedule for the first WD 120 may be performed recursively from a plurality of second network nodes 111 located in the trajectory of the WD 120. The second network node(s) 120 may return the determined Channel Access Schedules to the first network node 110. The first network node 110 may further compile the Channel Access Schedules determined by the first network node 110 and the second network node(s) 111. The Channel Access Schedules may e.g. be compiled into an allocationData object, which may be sent to the first WD 120.

Action 406 corresponds to Action A105 as discussed above with regards to FIG. 3.

Action 407

When the first network node 110 has determined the Channel Access Schedule for the first WD 120, the first network node sends the channel access schedule to the WD 120. The Channel Access Schedule may e.g. be sent to the first WD 120 using an allocationData object.

Action 407 corresponds to Action A106 as discussed above with regards to FIG. 3.

Figure 5:
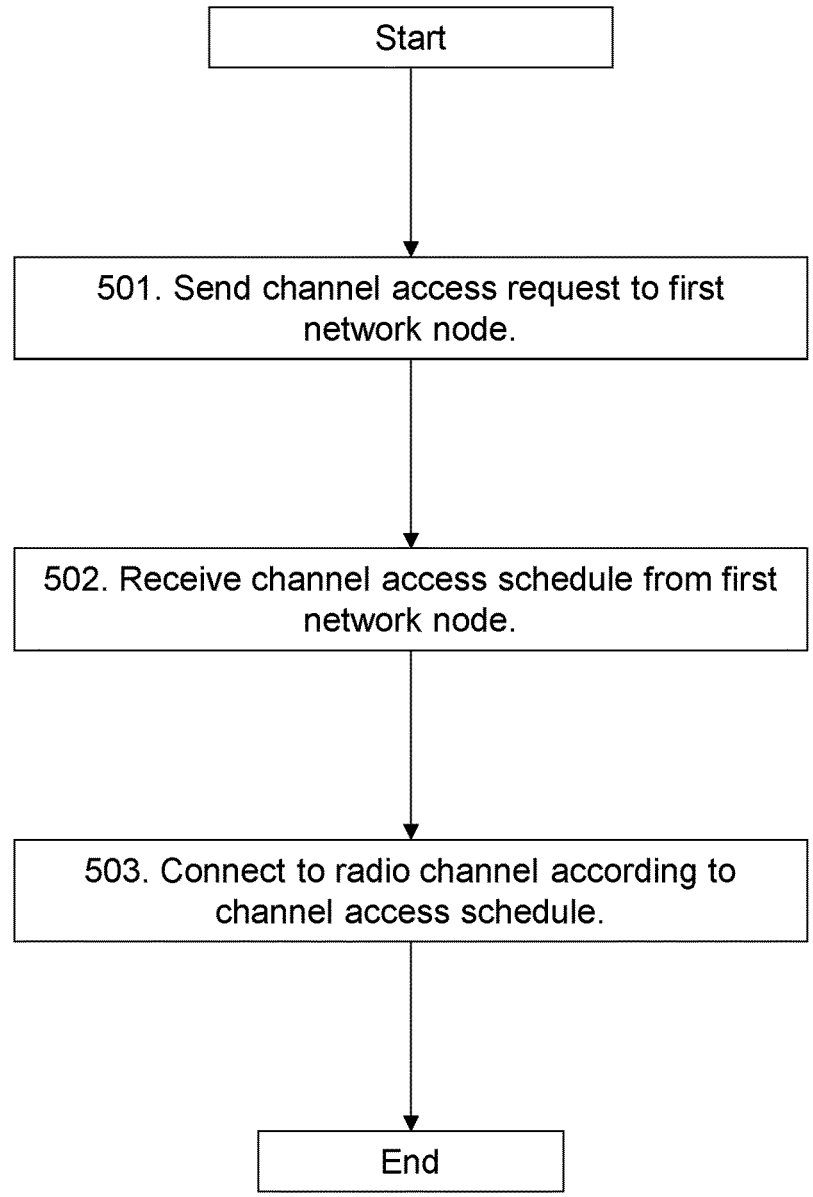
FIG. 5 is a flowchart depicting embodiments of a method in a wireless device.

Example of embodiments of a method in the WD 120 for accessing a channel, will now be described with reference to a flowchart depicted in FIG. 5. The WD 120 supports one or more Radio Access Technologies (RATs). The method comprises the following actions, which actions may be taken in any suitable order.

Action 501

The WD 120 sends a Channel Access Request to a first network node 110. The channel access request may comprise information regarding a number of requirements on the channel access. The information may comprise one or more of a mobility pattern, a data traffic characteristics, a criticality of data traffic and/or radio capabilities of the WD 120.

Action 501 corresponds to Action A101 as discussed above with regards to FIG. 3.

Action 502

The WD 120 receives a channel access schedule from the first network node 110. The channel access schedule may comprise information about a radio channel assigned to the WD 120.

The channel access schedule may e.g. comprise a list of channels and RATs assigned to the WD 120 for different time slots.

Action 502 corresponds to Action A106 as discussed above with regards to FIG. 3.

Action 503

When the WD 120 has received the Channel Access Schedule from the first network node 110, the WD 120 connects to the radio channel assigned to the WD 120 according to the channel access schedule received from the first network node 110.

Action 503 is similar to Action A107, A107a and A107b as discussed above with regards to FIG. 3.

Figure 6:
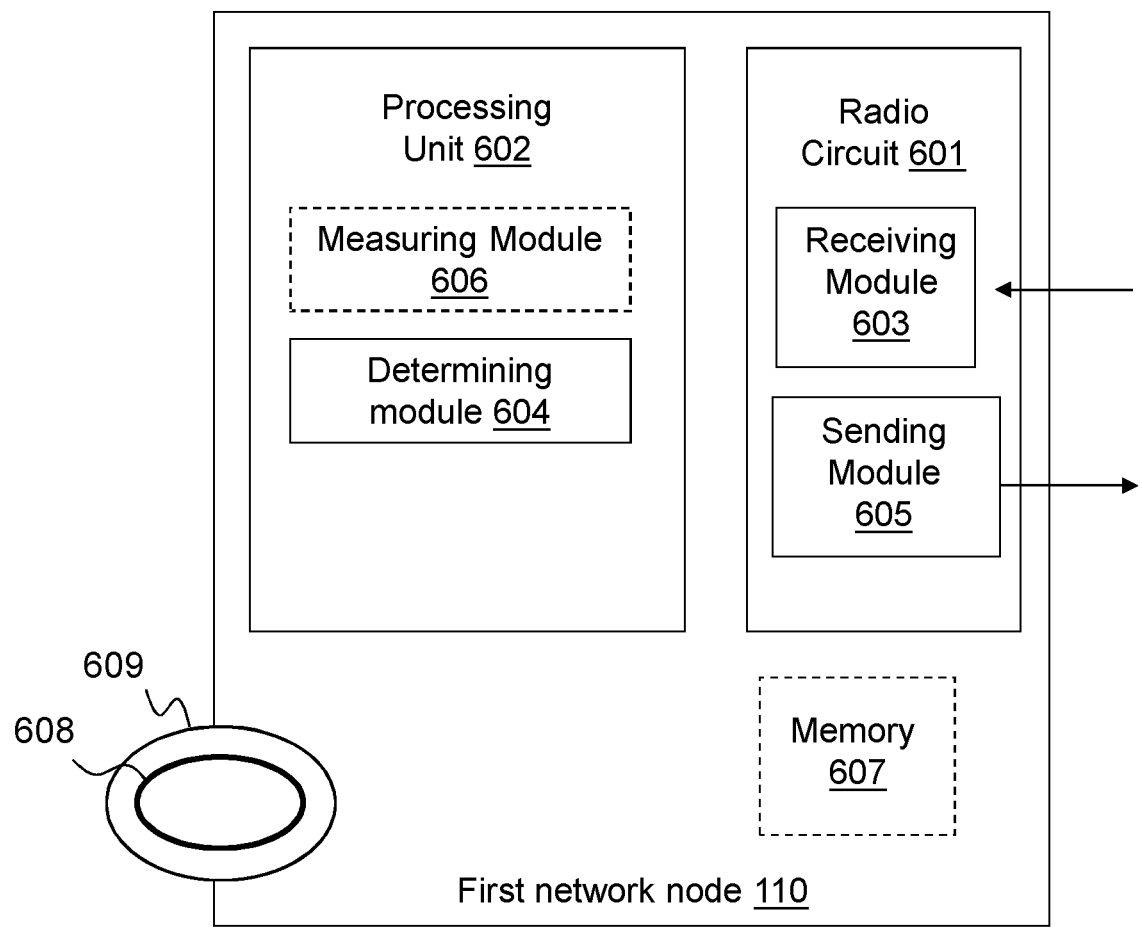
FIG. 6 is a schematic block diagram illustrating embodiments of a network node.

To perform the method actions for performing a method for managing channel access for a Wireless Device (WD) described above in relation to FIG. 4, the network node 110 may comprise the following arrangement depicted in FIG. 6. As mentioned above the WD 120 supports one or more Radio Access Technologies (RATs). Dashed lines of a box in FIG. 6 indicate that this module is optional.

The network node 110 comprises a radio circuitry 601 to communicate with the WD 120 and/or a second network node 111, and a processing unit 602.

The network node 110 is configured to, e.g. by means of a receiving module 603 and/or the radio circuitry 601 being configured to, receive a radio channel access request comprising information regarding a number of requirements on the channel access from the WD 120.

The network node 110 is configured to, e.g. by means of a determining module 604 and/or the processing unit 602 being configured to, determine a channel access schedule based on the received information and channel statuses stored in the network node 110, which channel access schedule comprises information about a radio channel assigned to the WD 120.

The network node 110 is configured to, e.g. by means of a sending module 605 and/or the radio circuitry 601 being configured to, send the channel access schedule to the WD 120.

The network node 110 may be configured to, e.g. by means of a measuring module 606 and/or the processing unit 602 being configured to, measure a channel status for all channels for all RATs within a geographical area served by the first network node 110.

The network node 110 may be configured to, e.g. by means of a memory 607 and/or the processing unit 602 being configured to, store the channel statuses measured.

The network node 110 is further configured to, e.g. by means of the sending module 605 and/or the radio circuitry 601 being configured to, send the channel status for all channels for all RATs within the geographical area served by the first network node 110 to a second network node 111.

The network node 110 may further be configured to, e.g. by means of the receiving module 603 and/or the radio circuitry 601 being configured to, receive, from the second network node 111, the channel status for all channels for all RATs within the geographical area served by the second network node 111.

The embodiments herein for managing channel access for a WD (120), may be implemented through one or more processors, such as the processing unit 602 in the network node 110 depicted in FIG. 6, together with computer program code for performing the functions and actions of the embodiments herein. The program code mentioned above may also be provided as a computer program product, for instance in the form of a data carrier carrying computer program code for performing the embodiments herein when being loaded into the in the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 607 comprising one or more memory units. The memory 607 is arranged to be used to store obtained information, measurements, data, configurations, schedulings, and applications to perform the methods herein when being executed in the network node 110.

The methods according to the embodiments described herein for the first network node 110 are respectively implemented by means of e.g. a computer program 608 or a computer program product, comprising instructions, i.e., software code portions, which, when executed on at least one processor, cause the at least one processor to carry out the actions described herein, as performed by the first network node 110. The computer program 608 may be stored on a computer-readable storage medium 609, e.g. a disc or similar. The computer-readable storage medium 609, having stored thereon the computer program, may comprise the instructions which, when executed on at least one processor, cause the at least one processor to carry out the actions described herein, as performed by the first network node 110. In some embodiments, the computer-readable storage medium may be a non-transitory computer-readable storage medium.

Those skilled in the art will also appreciate that the receiving module 603, the determining module 604, the sending module 605, and the measuring module 606, described above may refer to a combination of analog and digital circuits, and/or one or more processors configured with software and/or firmware, e.g. stored in the memory 607, that when executed by the one or more processors such as the processing unit 602 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 7:
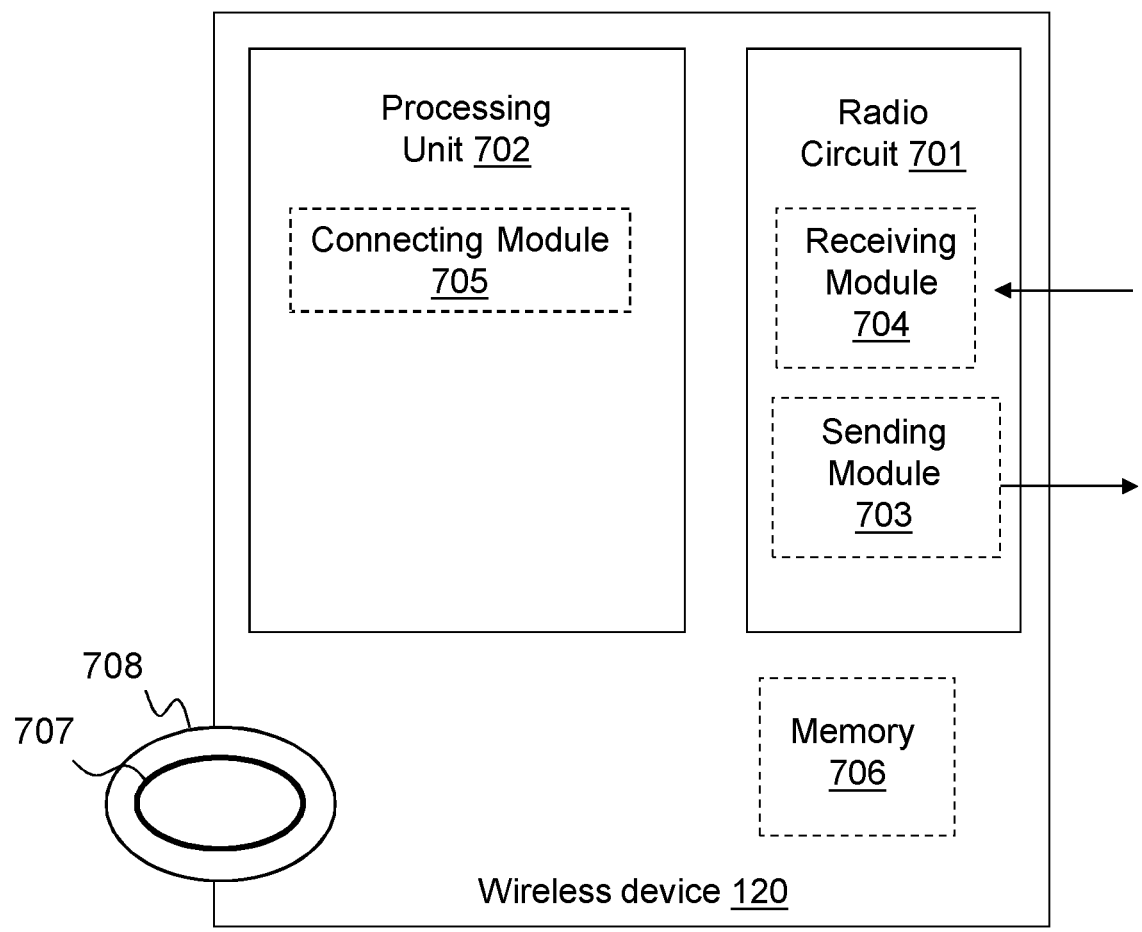
FIG. 7 is a schematic block diagram illustrating embodiments of a wireless device.

To perform the method actions for performing a method for accessing a channel described above in relation to FIG. 5, the WD 120 may comprise the following arrangement depicted in FIG. 7. As mentioned above the WD 120 supports one or more Radio Access Technologies (RATs). Dashed lines of a box in FIG. 6 indicate that this module is optional.

The WD 120 comprises a radio circuitry 701 to communicate with the first network node 111 and/or a second WD 121, and a processing unit 702.

The WD 120 is configured to, e.g. by means of a sending module 703 and/or the radio circuitry 701 being configured to, send a channel access request to the first network node 110, which channel access request comprises information regarding a number of requirements on the channel access.

The WD 120 is configured to, e.g. by means of a receiving module 704 and/or the radio circuitry 701 being configured to, receive a channel access schedule from the first network node 110, which channel access schedule comprises information about a radio channel assigned to the WD 120.

The WD 120 is further configured to, e.g. by means of a connecting module 705 and/or the processing unit 702 being configured to, connect to the radio channel assigned to the WD 120 according to the channel access schedule received from the first network node 110.

The embodiments herein for accessing a channel, may be implemented through one or more processors, such as the processing unit 702 in the WD 120 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the in the WD 120. One such carrier may be in the form of a CD ROM disc. It is however feasible with other data carriers such as a memory stick. The computer program code may furthermore be provided as pure program code on a server and downloaded to the WD 120.

The WD 120 may further comprise a memory 707 comprising one or more memory units. The memory 707 is arranged to be used to store obtained information, measurements, data, configurations, schedulings, and applications to perform the methods herein when being executed in the WD 120.

The methods according to the embodiments described herein for the WD 120 are respectively implemented by means of e.g. a computer program 707 or a computer program product, comprising instructions, i.e., software code portions, which, when executed on at least one processor, cause the at least one processor to carry out the actions described herein, as performed by the WD 120. The computer program 707 may be stored on a computer-readable storage medium 708, e.g. a disc or similar. The computer-readable storage medium 708, having stored thereon the computer program, may comprise the instructions which, when executed on at least one processor, cause the at least one processor to carry out the actions described herein, as performed by the WD 120. In some embodiments, the computer-readable storage medium may be a non-transitory computer-readable storage medium.

Those skilled in the art will also appreciate that the sending module 703, the receiving module 704 and the connecting module 705, described above may refer to a combination of analog and digital circuits, and/or one or more processors configured with software and/or firmware, e.g. stored in the memory 706, that when executed by the one or more processors such as the processing unit 702 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Although the method actions performed by the network node 110 herein are discussed in the context of a radio access node, the method may also be performed by a core network node or a distributed node 140 comprised in a first cloud 141, such as e.g. a server and/or a datacenter. The method actions may e.g. be performed by a logical function, which may be a centralized service hosted on the core network node or the distributed node.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method, performed by a first network node, for managing channel access for a Wireless Device (WD) which supports one or more Radio Access Technologies (RATs), the method comprising:
   receiving, from the WD, a radio channel access request comprising information regarding a number of requirements on the channel access;
   measuring the channel status for all channels for all RATs within the geographical area served by the first network node; and
   storing the measured channel statuses;
   sending, to a second network node, the channel status for all channels for all RATs within the geographical area served by the first network node; and
   receiving, from a second network node, the channel status for all channels for all RATs within the geographical area served by the second network node;
   determining a channel access schedule based on the received information and channel statuses that are received and/or stored for the channels and RATs available within respective geographical areas served by the first network node and the second network node, the channel access schedule comprising information about a radio channel assigned to the WD; and
   sending the channel access schedule to the WD.

2. The method of claim 1, wherein the information in the radio channel access request comprises:
   a mobility pattern of the WD;
   data traffic characteristics;
   criticality of data traffic; and/or
   radio capabilities of the WD.

3. The method of claim 2, wherein the mobility pattern comprises a direction of travel and a current speed of the WD.

4. The method of claim 3 wherein the channel access schedule is determined based on whether the current speed of the WD for a given time will cause the WD to be out of range of the first network node.

5. The method of claim 2, wherein the radio capabilities of the WD identify type(s) of communication protocols and part(s) of a frequency spectrum which the WD is able to access.

6. The method of claim 2, wherein the data traffic characteristics comprise information about duration and type of the data traffic transmitted and/or received from the WD.

7. The method of claim 2, wherein the criticality of data traffic comprises information that indicates whether data traffic transmitted and/or received from the WD is mission critical traffic or best effort traffic.

8. The method of claim 1, wherein the channel access schedule comprises a list of channels and RATs assigned to the WD for different time slots.

9. A method, performed by a Wireless Device (WD), for accessing a channel, the WD configured to support one or more Radio Access Technologies (RATs), the method comprising:
   sending a channel access request to a first network node, the channel access request comprising information regarding a number of requirements on the channel access;
   receiving, from the first network node, a channel access schedule that comprises information about a radio channel assigned to the WD, wherein the channel access schedule comprises a list of channels and RATs assigned to the WD for different time slots that are available within respective geographical areas served by the first network node and a second network node; and connecting to the radio channel assigned to the WD according to the channel access schedule received from the first network node.

10. The method of claim 9, wherein the information in the radio channel access request comprises:
a mobility pattern of the WD;
data traffic characteristics;
criticality of data traffic; and/or
radio capabilities of the WD.

11. A first network node for performing a method for managing channel access for a Wireless Device (WD) which supports one or more Radio Access Technologies (RATs), the first network node comprising:
processing circuitry;
memory containing instructions executable by the processing circuitry whereby the first network node is operative to:
receive, from the WD, a radio channel access request comprising information regarding a number of requirements on the channel access;
measure the channel status for all channels for all RATs within the geographical area served by the first network node; and
store the measured channel statuses;
send, to a second network node, the channel status for all channels for all RATs within the geographical area served by the first network node; and
receive, from a second network node, the channel status for all channels for all RATs within the geographical area served by the second network node;
determine a channel access schedule based on the received information and channel statuses that are received and/or stored for the channels and RATs available within respective geographical areas served by the first network node and the second network node, the channel access schedule comprising information about a radio channel assigned to the WD; and
send the channel access schedule to the WD.

12. The first network node of claim 11, wherein the information in the radio channel access request comprises:
a mobility pattern of the WD;
data traffic characteristics;
criticality of data traffic; and/or
radio capabilities of the WD.

13. A Wireless Device (WD) for performing a method for accessing a channel, the WD supporting one or more Radio Access Technologies (RATs), the WD comprising:
processing circuitry;
memory containing instructions executable by the processing circuitry whereby the WD is operative to:
send a channel access request to a first network node, the channel access request comprising information regarding a number of requirements on the channel access;
receive, from the first network node, a channel access schedule which comprises information about a radio channel assigned to the WD, wherein the channel access schedule comprises a list of channels and RATs assigned to the WD for different time slots that are available within respective geographical areas served by the first network node and a second network node; and
connect to the radio channel assigned to the WD according to the channel access schedule received from the first network node.

14. The WD of claim 13, wherein the information in the radio channel access request comprises:
a mobility pattern of the WD;
data traffic characteristics;
criticality of data traffic; and/or
radio capabilities of the WD.

15. A non-transitory computer readable recording medium storing a computer program product for controlling a Wireless Device (WD) for accessing a channel, the WD configured to support one or more Radio Access Technologies (RATs), the computer program product comprising software instructions which, when run on processing circuitry of the WD, causes the WD to:
send a channel access request to a first network node, the channel access request comprising information regarding a number of requirements on the channel access;
receive, from the first network node, a channel access schedule that comprises information about a radio channel assigned to the WD, wherein the channel access schedule comprises a list of channels and RATs assigned to the WD for different time slots that are available within respective geographical areas served by the first network node and a second network node; and
connect to the radio channel assigned to the WD according to the channel access schedule received from the first network node.

* * * * *